Patented Nov. 10, 1925.

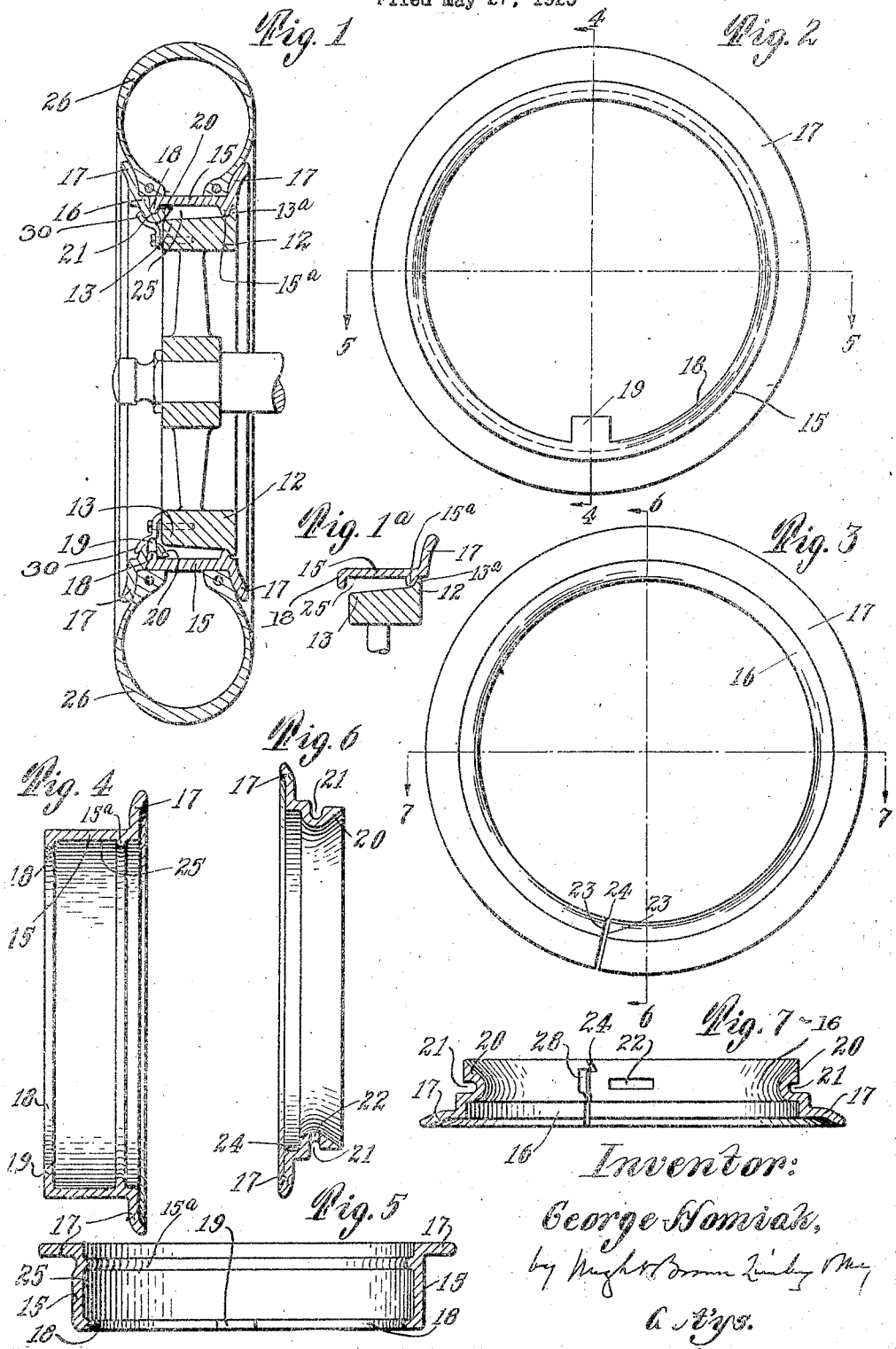

1,560,576

UNITED STATES PATENT OFFICE.

GEORGE HOMIAK, OF NEWMARKET, NEW HAMPSHIRE.

DEMOUNTABLE RIM FOR VEHICLE WHEELS.

Application filed May 27, 1925. Serial No. 33,131.

*To all whom it may concern:*

Be it known that I, GEORGE HOMIAK, a citizen of the United States, residing at Newmarket, in the county of Rockingham and State of New Hampshire, have invented new and useful Improvements in Demountable Rims for Vehicle Wheels, of which the following is a specification.

This invention relates to a vehicle wheel including a demountable rim separably engaged with a pneumatic or other resilient tire. The invention is embodied in certain improvements in the construction of the rim, whereby the rim is conveniently and securely engaged with the tire and with the wheel, and simplicity of construction is obtained.

Of the accompanying drawings forming a part of this specification—
Figure 1 is a sectional view of a wheel including a demountable rim embodying the invention.

Figure 1ª is a fragmentary view, similar to a portion of Figure 1.
Figures 2 and 3 are side views of the inner and outer rings shown in section by Figure 1.

Figure 4 is a section on line 4—4 of Figure 2.
Figure 5 is a section on line 5—5 of Figure 2.

Figure 6 is a section on line 6—6 of Figure 3.

Figure 7 is a section on line 7—7 of Figure 3.

The same reference characters indicate the same parts in all of the figures.

The felly 12 of a wheel with which my improved rim cooperates is provided with a bevelled peripheral face 13, extending from the outer side to an external stop bead 13ª at the inner side of the felly. The rim is composed of an inner ring 15, and an outer ring 16, each provided at its outer edge with a flange 17, formed to confine a tire shoe. The inner ring 15 has an internal stop bead 15ª, abutting the bead 13ª and its inner surface overhangs the face 13 of the felly, and is separated therefrom by an annular recess 25 (Figure 1ª). The ring 15 is provided at its outer edge with an inwardly projecting locking bead 18, on which is formed an inwardly projecting locking tongue 19.
The outer ring 16 is provided with an inner side face 20, formed to bear on the outer edge of the felly face 13, and enter the recess 25, and with a peripheral locking groove 21, formed to receive the locking bead 18. The ring 16 is also provided with a locking slot 22, adapted to receive the locking tongue 19.

The outer ring 16 is resilient and noncontinuous, so that it is adapted to be flexed or distorted, and to normally assume a circular form, the ring being interrupted at 24, so that it has free ends 23, which are movable relative to each other, to permit a distortion of the ring.

The tire shoe 26 may be placed on the inner ring 15, either before or after the ring is placed on the felly. When the ring 15 is in its predetermined position on the felly, and the recess 25 is formed, the outer ring 16 is suitably manipulated to lock it to the inner ring and seat its side face 20 on the outer edge of the face 13 of the felly. This manipulation involves a suitable distortion of the ring 16, to cause its slot 22 to slip on to the locking ear 19. After this, the ring 16, in assuming its normally circular form, enters the recess 25, so that the groove 21 receives the locking bead 18, and the side face 20 is seated on the felly. The felly is provided with clamps 30, bearing on the outer ring 16, as shown by Figure 1.

The rings are now securely engaged with each other and with the felly. The rings may be separated from each other by removing the clamps 30, distorting the ring 16 to remove its slot from the tongue 19, and then withdrawing the ring from the recess 25.

To facilitate the distortion of the ring 16, I provide a recess 28 (Figure 7) in one of the free ends of the ring adapted to receive a prying tool, whereby relative displacement of said ends may be effected.

I claim:

For use with a vehicle wheel whose felly has a bevelled peripheral face and an external stop bead at the inner edge thereof; a two-part demountable rim comprising an inner ring embracing the periphery of the felly and provided with an external tire-confining flange, said ring having at its inner edge an internal stop bead adapted to bear on the stop bead of the felly, and at its outer edge an inwardly projecting locking bead and a locking tongue projecting inward from the bead, the inner ring being spaced from the peripheral face of the felly to form an annular recess; and a flexible resilient non-continuous outer ring, provided with an external tire-confining flange, an external locking groove adapted to receive the locking bead, a slot adapted to receive the locking tongue, and an inner side face formed to enter said recess and bear on the outer edge of the peripheral face of the felly, the inner ring being normally circular and adapted to be distorted to engage its slot with the locking tongue, and to thereafter enter said recess to engage its locking groove with the locking bead and seat its side face on the felly.

In testimony whereof I have affixed my signature.

GEORGE HOMIAK.